Jan. 31, 1950  E. LABIN ET AL  2,495,737
RADIO LOCATING AND SIGNALING SYSTEM
Filed Nov. 6, 1943  3 Sheets-Sheet 1
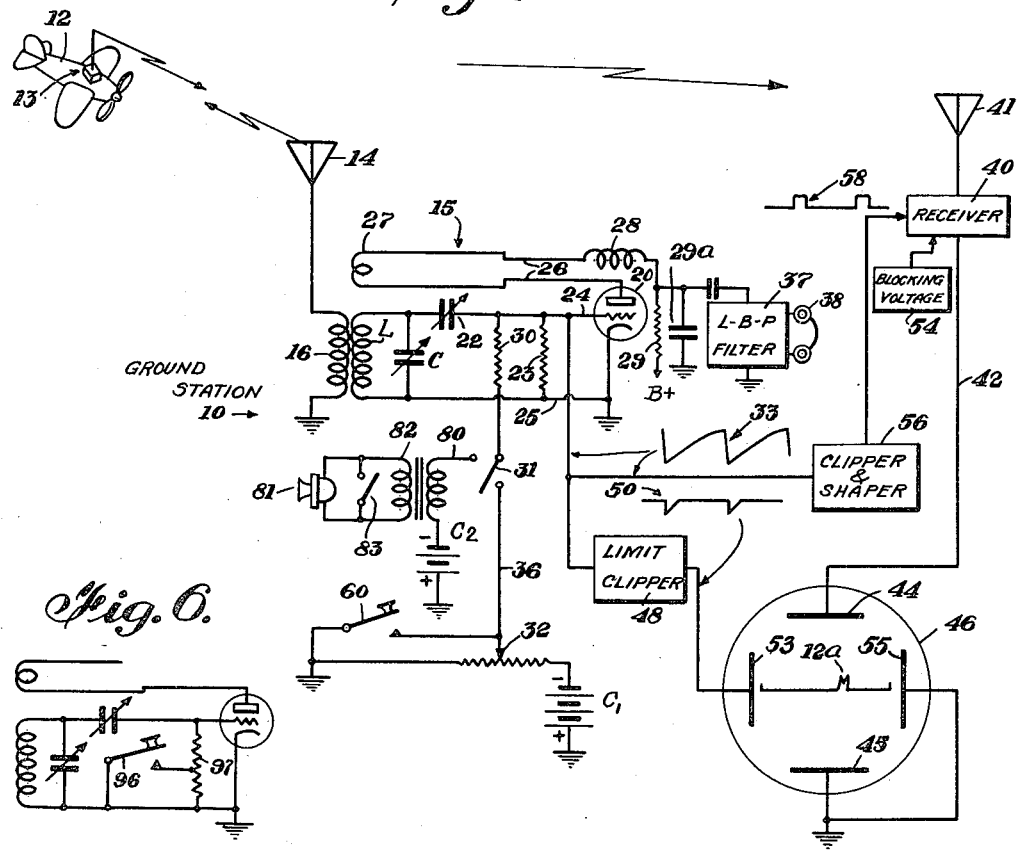
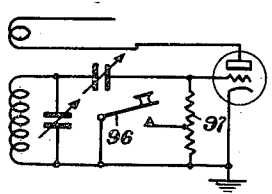
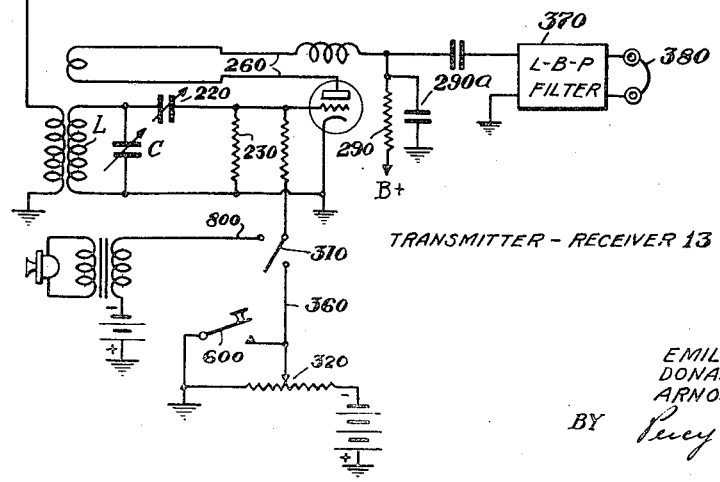
INVENTORS
EMILE LABIN
DONALD D. GRIEG
ARNOLD M. LEVINE
BY Percy P. Lantz
ATTORNEY

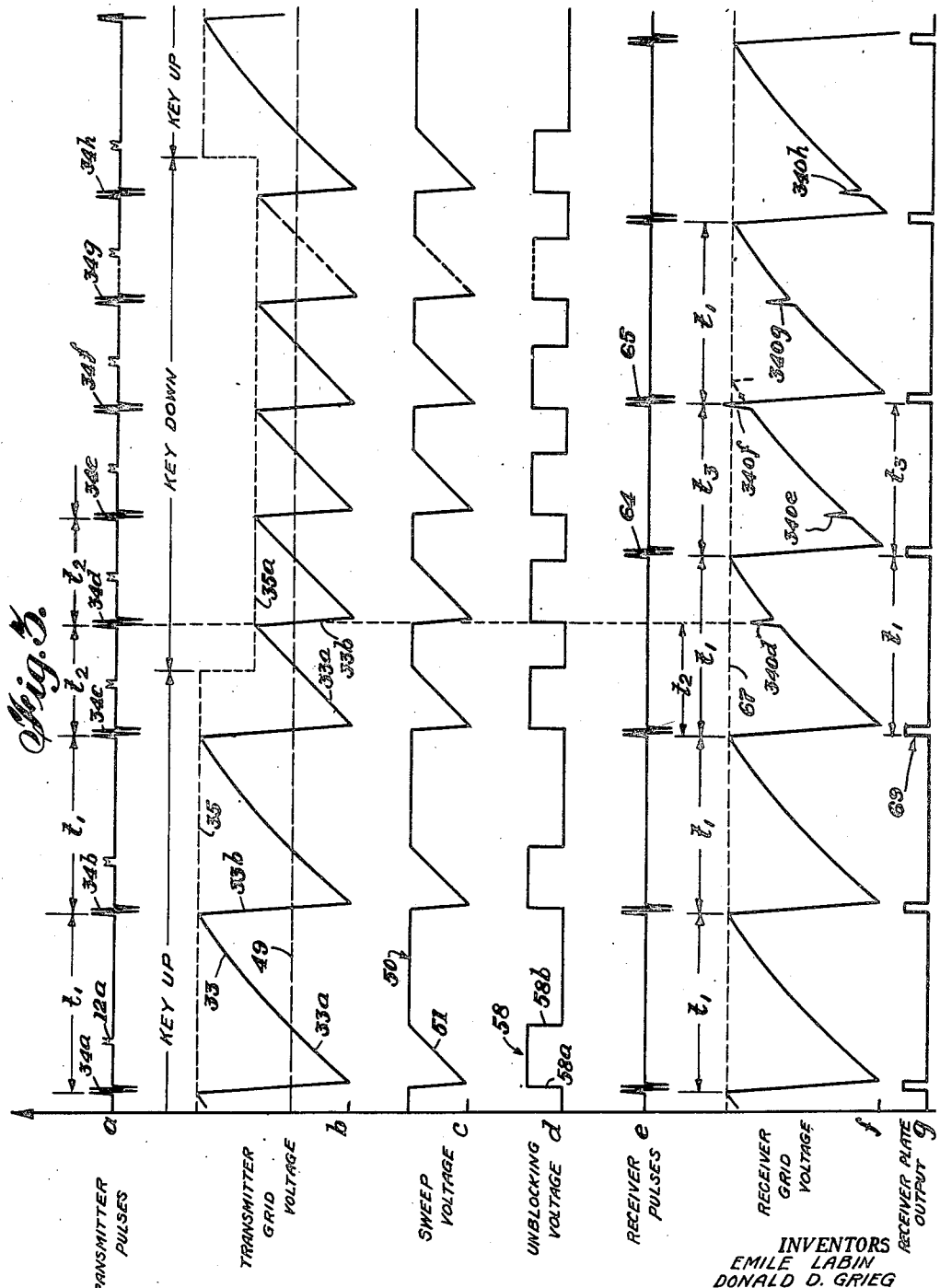

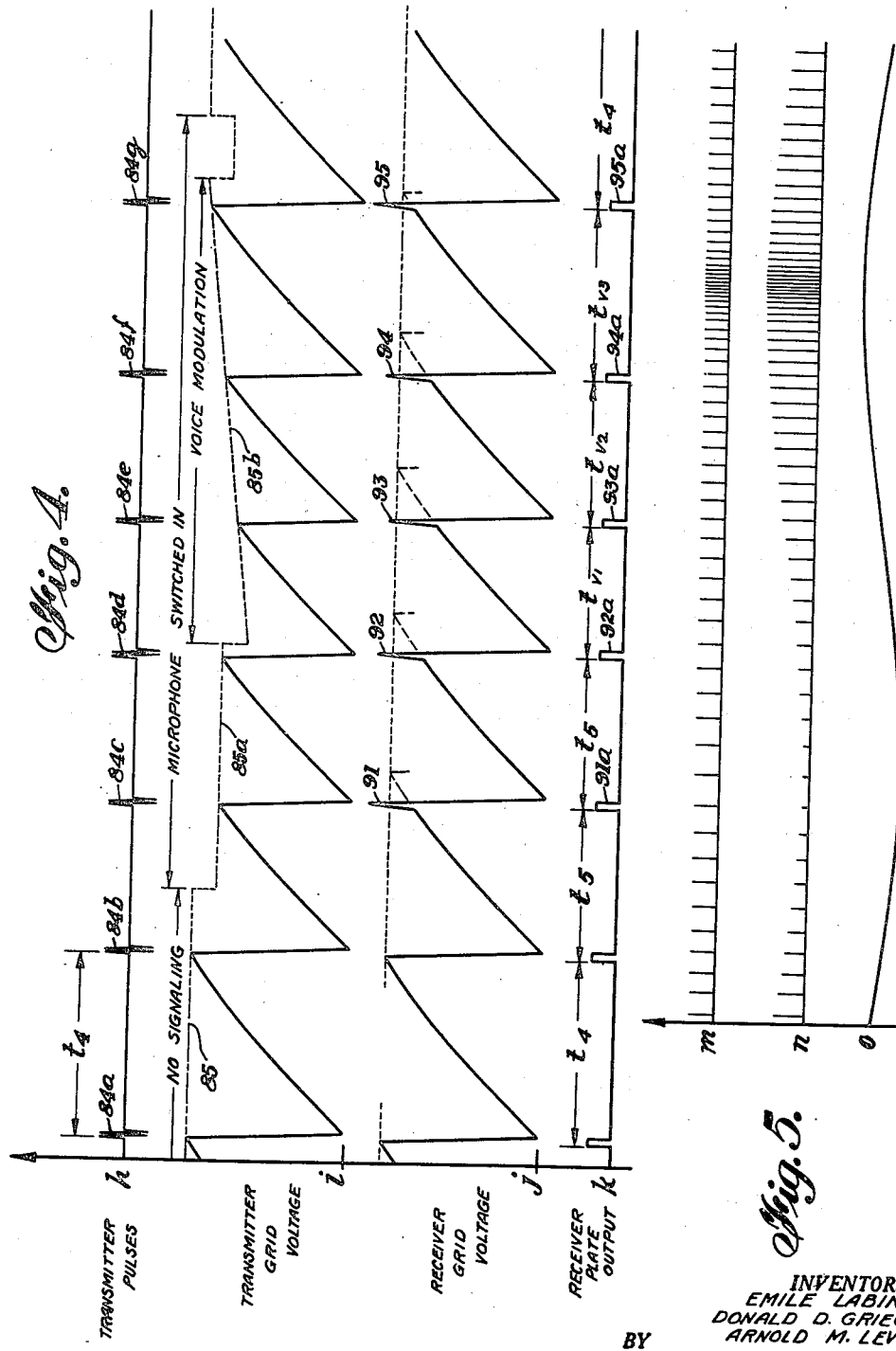

Patented Jan. 31, 1950

2,495,737

UNITED STATES PATENT OFFICE 2,495,737

RADIO LOCATING AND SIGNALING SYSTEM

Emile Labin, New York, and Donald D. Grieg and Arnold M. Levine, Forest Hills, N. Y., assignors to Federal Telephone and Radio Corporation, New York, N. Y., a corporation of Delaware Application November 6, 1943, Serial No. 509,230

11 Claims. (Cl. 343—6)

This invention relates to radio locating systems for determining the direction and range of obstacles such as aircraft and ships and more particularly to a system of this character by which communication may be had with other stations and/or the occupants of friendly craft particularly for identification purposes.

It is one of the objects of this invention to provide a method and means for detecting craft and for signalling to the occupants of a detected craft.

Another object of the invention is to provide a relatively simple combination radio locating and signalling system whereby the transmitter of pulse modulated carrier waves for obstacle detection purposes may be used, simultaneously and without interference to the obstacle detection function of the system, for transmission and reception of signals of intelligence.

Another object of the invention is to provide a radio locating system which is relatively simple and which requires a minimum number of parts.

A further object of the invention is to provide a transmitter-receiver system and method of transmitting and receiving signals of intelligence, either telephony or telegraphy, which are difficult for unauthorized persons to detect and exceedingly difficult to jam; and further, which, for telegraphy, translates the received signals into an audible "dot-dash" tone of substantially constant volume regardless of variations in amplitude of the received signals.

A still further object of the invention is to provide a new receiver circuit capable of detecting the signalling modulation of the pulse repetition frequency of a train of pulses.

According to one of the features of our invention, the radio locating system is used for detecting the location of aircraft and ships and when such a craft is located, the radio pulses or waves transmitted for obstacle detection purposes are signal modulated, e. g. by varying the pulse repetition frequency or rate. This enables the operator of a radio locating system to inquire as to the identity of the craft. The signal modulated pulses may, of course, be used for transmitting other messages such as instructions, for proper approach, weather conditions, etc. Friendly craft will be provided with proper equipment to detect the message and for making replies.

While the invention is particularly adaptable for use in locating aircraft and ships and for interrogating or otherwise communicating with the occupants of a detected craft, there are many additional features of the invention such, for example, as providing, on the one hand, a novel radio locating system and, on the other hand, a relatively simple transmitter-receiver system, as well as several subcombination features.

The above and other objects and features of the invention will become more clear upon consideration of the following detailed description to be read in connection with the accompanying drawings, in which:

Fig. 1 is a schematic diagram of a combination radio locating and signalling system according to the principles of the invention;

Fig. 2 is a schematic diagram of a transmitter-receiver device for use on a craft in conjunction with the radio locating system of Fig. 1 or for communicating with a similar transmitter-receiver device independent of the radio locating feature;

Figs. 3, 4 and 5 are graphical illustrations useful for explaining the operating features of the invention; and Fig. 6 is a schematic diagram of a modified form of the invention.

Referring to Fig. 1, a combination radio locating and signalling system 10 is shown which may comprise a ground station or may be mounted on a vehicle or placed aboard an airplane or ship, as may be desired. In Fig. 1, the system 10 is referred to as a ground station since it is illustrated in connection with the detection of aircraft such as airplane 12. If the craft is friendly, it will be provided with a transmitter-receiver device 13, such as shown in Fig. 2, with which communication may be had from the system 10. The system 10, however, will first be described with reference to the radio locating feature thereof and later with reference to the signalling feature thereof.

The system 10 includes an antenna 14 inductively coupled at 16 to a coil L of an oscillator circuit 15 which includes vacuum tube 20. The oscillator may be of any triggerable character which operates normally to produce short periods of radio waves which define preferably narrow width pulses for transmission purposes. The triggering feature of the circuit should be such as to respond to a triggering pulse occurring within a short time interval ahead of a normal pulsing period.

The form of oscillating circuit 15 chosen for purposes of illustrating the principles of this invention is of the positive feedback type. Coupled across the terminals of the coil L is the usual tunable condenser C by which the circuit is tunable over a selected band of radio and ultra high frequencies. The LC circuit is connected in the grid-to-cathode circuit of the tube 20 through a blocking condenser 22 which may be adjustable as indicated in the drawing. A grid leak 23 is connected between the grid connection 24 and the grounded cathode connection 25. The plate circuit 26 includes a feedback coil 27, a radio frequency choke 28 and a load resistor 29 connected to a positive source of plate current. A condenser 29a is connected across the resistor 29 to by-pass radio frequency components passed by the choke 28 and also to operate in conjunction with the resistor 29 as an energy averaging circuit to which is connected a low band-pass filter 37 and earphones 38, the operation of which will be described in more detail hereinafter.

The capacitance of the condenser 22 and the resistance of the grid leak 23 are so selected as to provide the desired time constant which determines, in conjunction with the bias applied to the grid connection 24 over resistor 30, the cyclic operation of the oscillator circuit. The resistor 30 is normally connected through switch 31 to a potentiometer 32 of a keying circuit 36 having a negative voltage source $C_1$ by which the bias on the grid connection 24 is adjustable. This bias controls the critical triggering level of the oscillator circuit with respect to the grid voltage as controlled by the time constant determined by the capacitance 22 and the grid leak resistance 23.

The cyclic operation of the oscillator is graphically illustrated by curves a and b of Fig. 3. The negative grid voltage of curve b follows generally the pattern of a saw-tooth wave 33 wherein the rising portions 33a are determined by the time constant of the capacitance 22 and resistance 23, while the portions 33b represent the discharge of the capacitance 22 during which the circuit oscillates to produce high frequency oscillatory waves defining pulse envelopes 34a, 34b, etc. of curve a. The broken line 35 represents the triggering level at which the oscillator spills over and starts the oscillating period. As indicated by the wave 33, and the pulses of curve a, the oscillator operates cyclically to produce pulses at a regularly recurring rate depending upon the time constants of elements 22 and 23 and the triggering level 35. By varying the value of one or the other of the elements 22 or 23, or by varying the bias on grid connection 24, the rate of the cycle operation of the oscillator may be varied.

The radio locating feature of the system 10 includes a radio receiver 40 having an antenna 41 and an output connection 42 applied across the vertical deflecting plates 44 and 45 of a cathode ray oscillograph 46 to ground. The sweep circuit of the oscillograph 46 is provided with a sweep potential by limit clipper 48 which clips the wave 33 (curve b, Fig. 3) at limit level 49. This limit clipping operation produces a voltage wave 50 (curve c). The valve 50 includes a substantially linearly rising voltage 51 which serves to control the sweep of the cathode ray beam from left to right between horizontal deflecting plates 53 and 55. It will be understood, of course, that for each cyclic operation of the oscillator circuit the cathode ray beam is caused to sweep across the screen of the oscillograph from left to right at a rate of speed corresponding to the time constants of the elements 22 and 23. It will be noted that the sweep portion 51 of the wave 50 follows directly the occurrence of the oscillations defining pulses 34a, 34b, 34c, etc., so that the detection of an echo pulse 12a (curve a, Fig. 3), such as might be caused by airplane 12, will produce a pulse deflection of the tracing as indicated by echo pulse 12a on the oscillograph 46. By suitably calibrating the screen of the oscillograph, either by markings or by calibration pulses, the approximate distance to the airplane 12 may be determined.

In order to block the receiver during the transmission of the pulses 34a, 34b, etc. and to unblock the receiver so as to detect echo reflections of obstacles within the range of the system, a source of blocking voltage 54 is applied to the receiver 40 to maintain the receiver normally blocked, and an unblocking voltage is obtained from the oscillator circuit by clipping and shaping a portion of the grid voltage wave 33. The clipping level may be the same as the level 49 or some other level. In fact the same clipped voltage of the clipper 48 may be used by passing it through a suitable shaper. As shown, however, a separate clipper and shaper 56 is provided for this purpose. This provides a train of rectangular pulses 58 as indicated by curve d. It will be observed that the leading edges 58a of these pulses occur substantially in coincidence with the trailing edges of the pulses 34a, 34b, etc. while the trailing edges 58b coincide or extend beyond the inclined portions 51 of curve c. It will be understood, however, that the rectangular pulses may be extended further to any desired width so long as each occurs at or directly following a transmitted pulse and overlaps a substantial portion of the sweep interval represented by the portion 51. The time interval required for the unblocking potential to overcome the blocked condition of the receiver insures that the receiver is unblocked after transmission of each pulse.

From the foregoing, it will be clear that the transmission of regularly recurring pulses and the detection of echo reflections produced in response thereto by the presence of obstacles enables an operator of the system 10 to determine the presence of such obstacles and the distance to the obstacles. It will be understood, of course, that the antenna systems 14 and 41 may be directive in character and include direction finding equipment whereby the elevation and azimuth of the obstacles may be determined. This additional equipment, however, has not been illustrated since the principles of the invention are concerned more particularly with the detection of craft and communication with the occupants of friendly craft for identification and other purposes.

For the purpose of signalling to the occupants of a detected craft, the keying circuit 36 of system 10 is provided with a signalling key 60 which controls the negative bias on the grid connection 24. With the key in open or "up" position, the oscillator will operate at a given pulse repetition frequency such as determined by the level 35. When the key is in "down" or closed position, the bias will be sharply decreased causing the oscillator to operate at a different pulse repetition frequency such as indicated by lever 35a. The pulses 34a, 34b and 34c of Fig. 3 represent the output of the circuit during an interval when the key 60 is in open position and the pulses 34d—34h represent the pulse output with the key in closed position. It will be observed that the time interval between successive pulses during the open position of key 60 is $t_1$ while the time interval between successive pulses during the closed position of the key 60 is $t_2$. This difference in the time interval of the two groups of pulses is indicative of the two different pulsing rates obtainable by actuation of the key 60.

This keying alteration of the pulsing rate of the oscillator of system 10 is caused to produce intelligible signals in the transmitter-receiver device 13 of Fig. 2. It will be observed that the circuit of Fig. 2 is identical except that the connection from the grid of the oscillator tube to the clippers 48 and 56, and the associated receiver are omitted. Because of this identity, like parts of the system are given the same numbers plus an added integer 0. The LC circuit of the device is tuned to the same frequency as the LC circuit of the system 10. The time constant represented by the elements 220 and 230 is chosen substantially equal to the time constant of the elements 22 and 23. This relationship may be obtained by tuning the condenser 220 should the time constants of the two circuits differ widely. Connected to the plate circuit 260 is an averaging circuit 290, 290a, a low by-pass filter 370 and earphones 380.

Assuming that the craft 12 is flying within the range of the radio locating system 10, the pulse reflection thereof will be detected as indicated on the oscillograph by echo pulse 12a. The operator of the system will, in order to determine the identity of the craft, transmit a telegraph message or other signal by operating the key 60 thereby altering, according to the signal, the operation of the system between two pulse repetition rates. When the operator in the craft 12 detects the pulses of the radio locating system 10, (the LC circuits of both the system 10 and the device 13 being normally tuned to the same R. F. frequency) he synchronizes the transmitter-receiver to one of the pulsing rates, usually the one corresponding to "key up" position, by adjusting the potentiometer 320. Thus synchronized, both oscillators will be operating at the same pulsing rate such as may be represented by time interval $t_1$, with no tone being received at the phones 380 through the filter 370. When the operator at the radio locating station 10 starts transmitting his message, the change in the pulsing rate produces a beat frequency with the oscillator of the transmitter-receiver device 13.

This beat frequency operation will be clear from an inspection of curves $e$, $f$ and $g$ of Fig. 3. These three curves while shown with the same time base as the curves $a$ to $d$ for simplicity, will actually be displaced an amount corresponding to the interval of time required for the transmitted pulses to reach the device 13. By comparing curves $a$ and $e$, it will be observed that the device 13 is operating at the same pulsing rate as the system 10. When the system 10 is keyed to the second pulsing rate as indicated by the pulses $34d$—$34h$, it will be observed that the energy $340d$ (curve $f$) of pulse $34d$ is received at the device 13 prior to the next normal pulsing period indicated by pulse 64. The pulse energy $340d$, however, occurs during the low portion of the grid voltage far below the critical level 67 and therefore fails to trigger the transmitter-receiver device. The energy of the next succeeding pulse $34e$ is likewise too low on the grid voltage curve to effect a triggering operation. The pulse energy $340f$, however, occurs at a point sufficiently high on the grid voltage curve to trigger the transmitter-receiver device into oscillations thereby producing pulse 65 which is at a time interval $t_3$ from the preceding pulse 64 quite different from the time interval $t_1$ which is representative of normal pulsing operation. The transmitter-receiver device, however, will continue to operate normally thereafter until another pulse from the system 10 again triggers the device into oscillation. These triggering operations produce in effect a "beat" frequency which is passed in the form of plate output pulses 69 (curve $g$, Fig. 3) by the low band-pass filter 370, thereby producing a harmonic tone in the earphones 380.

Since the telegraph signalling of messages is determined by this "beat" frequency of the transmitted pulses triggering the operation of the receiver circuit, a large number of transmitted pulses is required for each "dot" and "dash" signal component. The normal pulsing rate, however, is preferably high so that several hundred pulses will occur during a keying operation for either a "dot" or "dash" signal.

It will be understood in connection with telegraph signalling that instead of shortening the intervals between successive pulses as indicated by the pulses of curve $a$, Fig. 3, the circuit may be so arranged that additional negative bias is applied to the grid connection 24 of Fig. 1 by the closing of the key. In such case, the first pulse produced, after the key is moved down to circuit closing position, would occur beyond instead of ahead of the pulse 64. Regardless of which way the negative bias is keyed, the receiver will operate on the "beat" frequency principle and thereby produce a "dot" or "dash" signal depending upon the operation of the key.

In order to reply from the craft 12 to the ground station 10, the operator in the craft will actuate the key 600 when the operator at station 10 has ceased actuation of the key 60. The keying actuation of the transmitter-receiver of Fig. 2 produces an alteration in the operation of the circuit between two pulsing rates in the same manner as in the case of the circuit of Fig. 1. When the key 600 is moved down thereby reducing the negative bias, the circuit operates at a faster pulsing rate similarly as indicated by curve $b$ of Fig. 3. This variation in the pulsing rate produces a "beat" frequency or harmonic in the oscillating circuit of the system 10 and this harmonic energy is detected by the phones 38 in the manner hereinbefore described in connection with the receiving function of the device 13.

While telegraph signalling is desirable because of simplicity of the circuit and for distance communication where the system is also used for obstacle detection at long ranges such as 150 to 200 miles more or less, it will be recognized that the system may also be used for speech communication. Speech communication may be had from the system 10 to the craft 12 by changing the switch connection 31 with the keying circuit 36 for connection with a microphone circuit 80. The microphone circuit includes a microphone 81, a transformer 82 and a source of negative voltage $C_2$ which is connected between the secondary of the transformer 82 and ground. The negative voltage $C_2$ is preferably different from the negative voltage $C_1$ determined by the adjustment of the potentiometer contact 32. This difference in the negative bias is readily observable by comparing the critical triggering level 35, 35a of curve $b$, Fig. 3, with the triggering level 85, 85a of curve $i$, Fig. 4. Preferably, the negative bias of curve $i$, Fig. 4. Preferably, the negative bias provided by the source $C_2$ is such as to produce a triggering level 85a about half way between the triggerable limits of a receiver circuit. It will thus be seen that for voice modulation, with given plus and minus limits with respect to the triggering level 85a, pulses will be produced at rates which operate to trigger the receiving circuit.

Referring particularly to Fig. 4, curve $h$ represents the pulse waves transmitted by the system 10, the pulses 84a and 84b of timing $t_4$ occurring while the switch 31 is connected with the keying circuit 36, pulses 84c and 84d occurring after the switch 31 has been connected with the microphone circuit 80 but before microphone switch 83 has been opened, thereby representing the pulsing operation in the absence of voice modulation. When the microphone switch 83 is opened, the microphone will respond to voice and other audible sounds thereby altering the bias from $C_2$ according to the amplitude of the audible sounds.

A small segment of voice modulation is indicated on curve $i$ illustrating the effect of a rising amplitude as indicated by the triggering level 85b. It will be observed that the voice modulation thus controls the pulsing rate of the oscillator thereby producing frequency modulation of the pulse 84b—84g, the spacing between the succeeding pulse depending upon the corresponding amplitude of the voice signals.

Curve $j$ of Fig. 4 represents the grid voltage of the receiving circuit of Fig. 2. As previously pointed out, the negative bias of the oscillating circuit of Fig. 2 must correspond substantially to the normal negative bias placed upon the circuit of the transmitter system 10. Where speech transmission is used, the switch 310 may be used as the microphone switch, that is to say, the switch 310 is maintained in connection with the keying circuit 360 during reception of voice signals and is switched to the microphone circuit 800 when it is desirable to transmit voice signals. Thus, the triggering level 86 which corresponds to the triggering level 85 of the system 10 is maintained during reception of voice signals.

When the transmitter circuit of the system 10 is conditioned for transmission of voice as indicated by the triggering level 85a, the circuit in Fig. 2 will be triggered by the pulses 84c and 84d as indicated at 91 and 92 thereby producing output pulse energy 91a and 92a at an unmodulated pulsing rate represented by the interval $t_5$. When the transmission is voice modulated, the pulses 84e through 84g are produced at rates corresponding to the instantaneous amplitude of the modulating voice signals. These pulses operate to trigger the receiver circuit as indicated at 93, 94 and 95 thereby producing output pulses 93a, 94a and 95a with differing intervals $t_{v1}$, $t_{v2}$ and $t_{v3}$, respectively. This frequency modulation of the pulses is best seen in the illustrations of Fig. 5. Curve $m$ represents the frequency modulation of the transmitted pulses for a modulating sine wave, curve $n$ represents the averaging function of the circuit 290, 290a (Fig. 2) and curve $o$ represents the envelope output of the low band-pass filter 370 to the earphones 380.

For a 12 k. c. pulse repetition rate, a maximum range of about 10 miles is possible. The 12,000 pulses per second obtained at this rate, however, is much better than is actually necessary for understandable voice transmission. Most telephone systems operate on about 1,200 cycles per second and such operation would permit a range of about 100 miles. It will thus be understood that for ranges even greater than 100 miles it is possible to use understandable voice transmission. For the longer ranges of 150 to 200 miles or more, it is preferable to use the telegraph signalling method since voice, because of the low pulsing rate required for such long ranges, would be poorly defined and therefore difficult to understand. Where the obstacle detection feature of the invention is not essential, the transmission of pulses is preferably in the order of about 12 k. c. since for the higher pulsing rates lower peak power is required and more perfect speech transmission is effected.

In Fig. 6 a fragmentary portion of the oscillator circuit is shown with a key 96 connected so as to short out a part of the grid leak 97 when the key is in closed position. This keying arrangement provides for altering the time constant of the circuit with respect to a given triggering level. This arrangement greatly simplifies the signalling feature of the invention but when used in a circuit of the character shown in Fig. 1, the variations in the time constant are passed on to the sweep circuit and blocking circuit of the obstacle detecting part of the system. Thus, the key arrangement of Fig. 6 while suitable for use in the circuit of Fig. 2 is not desirable in the circuit of Fig. 1 since the keying operation would interfere with the accurate distance indications of obstacles detected by the system.

From the foregoing description, it will be clear that the triggering principle of the invention renders the circuits substantially free from interference and jamming. For example, the interfering pulses occurring between the normal pulsing period of a receiver circuit will not trigger the receiver unless the pulse occurs on the high portion of the grid voltage curve (see curve $f$ of Fig. 3) where the pulse energy is sufficient to pierce the triggering level 67. This is clearly shown by the failure of pulses 340d, 340e and 340g to trigger the operation of the receiver circuit.

While we have described above the principles of our invention in connection with specific apparatus, and particular modifications thereof, it is to be clearly understood that this description is made only by way of example and not as a limitation on the scope of our invention as set forth in the objects of our invention and the accompanying claims.

We claim:

1. A radio system comprising an oscillator circuit operable to transmit regularly recurring pulse-defining waves, said oscillator circuit having a time constant control means for controlling the rate of cyclic operation thereof, said control means providing for a flow of current the voltage wave of which, at least in part, resembles a sawtooth wave, means to detect echo reflections of the pulse waves caused by the presence of a craft, said means for detecting echo reflections including a radio receiver, means for normally blocking said receiver, means for clipping and shaping a portion of said saw-tooth voltage wave to provide an unblocking voltage for said receiver, means for applying said unblocking voltage to said receiver, a cathode ray oscillograph, means for clipping the saw-tooth portion of said voltage wave, and means for applying the saw-tooth voltage obtained by the clipping means to the sweep circuit for said oscillograph.

2. A pulse wave transmitter circuit comprising an oscillator, control means for determining the cyclic operation of the oscillator for producing regularly occurring periods of pulse-defining waves, a source of signal energy, and means to apply said signal energy to said control means for varying the cyclic operating rate of said oscillator according to the instantaneous values of the signal energy, said signal source includes a source of voltage and means for varying the voltage according to the amplitude of the intelligence of signal such as voice; and the means for applying signal energy to said control means includes a grid biasing connection whereby the critical triggering level of the oscillator is controlled by the amount of bias imposed by the instantaneous amplitude of the signal controlled voltage.

3. A method of detecting the presence of craft such as airplanes and ships and communicating with the occupants of a detected craft comprising, at a given station, transmitting a train of pulses at a given repetition rate, detecting the echo pulses caused by a craft, communicating with the occupants of the craft by varying the pulse repetition rate of the pulses transmitted in accordance with the intelligence to be communicated, and at said craft receiving the transmitted pulses, detecting the intelligence produced by the varying of the pulse repetition rate of the received pulses and communicating from the craft to said given station by transmitting from said craft a train of pulses of a repetition rate bearing a fixed relation to the repetition rate of the pulses from said station and varying the pulse repetition rate thereof in accordance with the intelligence to be communicated, receiving said last named transmitted pulses at said location, detecting the intelligence produced by said last named varying of the pulse repetition rate, the step of varying of the pulse repetition rate comprising producing a voice controlled wave, and controlling the pulse repetition rate according to the instantaneous amplitude of voice wave.

4. A method of communicating from a first transmitting device to a second transmitting device wherein said second device is triggerable in response to pulses transmitted by the first and received by the second device and occurring within a given interval ahead of a normal pulsing period, comprising operating each of the two devices at a given pulse repetition rate, transmitting signals from said first device to said second device by varying the operation of said first device between said given rate in accordance with the intelligence to be communicated and a second pulse repetition rate, detecting at said second device the intelligence of the transmitted signals by detecting the triggering action of said second device in response to the pulses from said first device, communicating from said second device to said first device by varying the operation of said second device between said given rate and another pulse repetition rate in accordance with the intelligence to be communicated, and detecting at said first device the intelligence of the transmitted signals by the triggering action of said first device in response to the pulses from said second device.

5. A method of communicating from a first transmitting device to a second transmitting device wherein said second device is triggerable in response to pulses transmitted by the first and received by the second device and occurring within a given interval ahead of a normal pulsing period, comprising operating each of the two devices at a given pulse repetition rate, transmitting signals from said first device to said second device by varying the operation of said first device between said given rate in accordance with the intelligence to be communicated and a second pulse repetition rate, detecting at said second device the intelligence of the transmitted signals by detecting the triggering action of said second device in response to the pulses from said first device, comprising also communicating from said second device to said first device by varying the operation of said second device between said given rate and another pulse repetition rate in accordance with the intelligence to be communicated, and detecting at said first device the intelligence of the transmitted signals by detecting the triggering action of said first device in response to the pulses from said second device, the transmitting operation including the step of producing a voice controlled wave, and varying the pulse repetition rate according to the instantaneous amplitude of voice wave.

6. A combination radio locating and communicating system comprising, at a given station, means for transmitting recurring pulses of a given repetition rate means to detect echo pulses caused by the presence of a craft, means for varying the pulsing rate of said recurring pulses in accordance with the intelligence to be communicated to the occupants of said craft, and means for receiving pulses synchronized to the repetition rate of said pulses; and at said craft, a pulsing device synchronizable to said given repetition rate of said recurring pulses, and means associated with said device for detecting pulse rate variations of said recurring pulses with respect to said given repetition rate, the means for detecting echo pulses including an echo pulse indicator and means for synchronizing the operation of the echo pulse indicator with any instantaneous pulse repetition rate at which said pulse transmitting means operates so that the detection of the craft is maintained continuous during the signalling operation.

7. A combination radio locating and signalling system comprising an oscillator circuit operable to transmit regularly recurring pulse defining waves, said oscillator circuit having a time constant control means and a biasing control means, one of said control means being operable relative to the control function of the other of said control means, whereby the pulsing rate of the oscillator is controllable, means to detect reflections of the pulse waves caused by the presence of a craft, and means to signal the occupants of said craft by operating said one control means in a signalling manner, said time constant control means providing for a flow of current the voltage wave of which, at least in part, resembles a saw-tooth wave; and the means for detecting reflections including a cathode ray oscillograph, means for clipping the saw-tooth portion of said wave, and means for applying the saw-tooth voltage thus obtained to said oscillograph as the sweep voltage thereof.

8. A combination radio locating and signalling system comprising an oscillator circuit operable to transmit regularly recurring pulse defining waves, said oscillator circuit having a time constant control means and a biasing control means, one of said control means being operable relative to the control function of the other of said control means, whereby the pulsing rate of the oscillator is controllable, means to detect reflections of the pulse waves caused by the presence of a craft, and means to signal the occupants of said craft by operating said one control means in a signalling manner, the time constant control means providing for a flow of current the voltage wave of which has a given cyclic form in synchronism with the cyclic operation of the oscillator; and the means for detecting reflections including a radio receiver, means for normally blocking said receiver, means for clipping a portion from said wave, and means for applying the voltage obtained by the clipping means to unblock said receiver for a desired portion of said cyclic operation.

9. A combination radio locating and signalling system comprising an oscillator circuit operable to transmit regularly recurring pulse defining waves, said oscillator circuit having a time constant control means and a biasing control means, one of said control means being operable relative to the control function of the other of said control means, whereby the pulsing rate of the oscillator is controllable, means to detect reflections of the pulse waves caused by the presence of a craft, and means to signal the occupants of said craft by operating said one control means in a signalling manner, the time constant control means providing for a flow of current which, at least in part, resembles a saw-tooth wave the cycle of which corresponds to the cyclic operation of the oscillator; and the means for detecting reflections including a radio receiver, an oscillograph, means for clipping the saw-tooth portion of said wave, means for applying the saw-tooth voltage obtained by said clipping means to the sweep circuit of said oscillograph, means to normally block said receiver, means to reshape portions obtained from said wave by the clipping means and means utilizing said reshaped portion to unblock the receiver for substantially the duration of said sweep voltage.

10. A communicating system comprising a first transmitting device and a second transmitting device wherein each of said devices is triggerable in response to pulses occurring within a given interval ahead of its normal pulsing period, each of the two devices having means for adjusting the devices for a given pulsing repetition rate, means for altering the rate of pulsing operation of said first device in accordance with the intelligence of signals from a source whereby at least certain of the pulses produced by said first device trigger said second device, and means associated with said second device to detect the triggering action thereof in response to a signalling operation of said first device, said means for altering the rate of pulsing operation of said first device including means for altering the pulsing rate of said first device between said given rate and another rate wherein the difference between the two rates is such that only part of the pulses produced trigger said second device, and means to detect the signals of intelligence by detecting the beat frequency of the triggering action.

11. A transmitter-receiver circuit comprising an oscillator, control means for determining the cyclic operation of the oscillator, said control means normally producing regularly occurring periods of pulse-defining waves, detector means associated with said oscillator circuit to detect variations in the operation thereof from a given pulsing rate, a source of intelligence signals, and means to apply said signal to said control means for varying the cyclic operating rate of said oscillator, in accordance with the intelligence of the signals from said source, said detector means including a low band-pass filter coupled to a part of the oscillator circuit for passing pulse energy varying from said given pulsing rate.

EMILE LABIN.
DONALD D. GRIEG.
ARNOLD M. LEVINE.

REFERENCES CITED

The following references are of record in the file of this patent:

UNITED STATES PATENTS

| Number | Name | Date |
| --- | --- | --- |
| 1,610,425 | Chaffee | Dec. 14, 1926 |
| 1,995,285 | Albersheim et al. | Mar. 26, 1935 |
| 2,061,734 | Kell | Nov. 24, 1936 |
| 2,113,214 | Luck | Apr. 5, 1938 |
| 2,134,716 | Gunn | Nov. 1, 1938 |
| 2,157,122 | Dunmore | May 9, 1939 |
| 2,189,549 | Hershberger | Feb. 6, 1940 |
| 2,225,046 | Hunter | Dec. 17, 1940 |
| 2,227,598 | Lyman et al. | Jan. 7, 1941 |
| 2,252,083 | Luck | Aug. 12, 1941 |
| 2,316,868 | Hunt | Apr. 20, 1943 |
| 2,323,596 | Hansell | July 6, 1943 |
| 3,379,899 | Hansell | July 10, 1945 |
| 2,381,928 | Roberts | Aug. 14, 1945 |
| 2,401,618 | Crosby | June 4, 1946 |
| 2,407,199 | Wolff | Sept. 3, 1946 |
| 2,407,644 | Benioff | Sept. 17, 1946 |
| 2,415,095 | Varian | Feb. 4, 1947 |
| 2,422,382 | Winchel | June 17, 1947 |

FOREIGN PATENTS

| Number | Country | Date |
| --- | --- | --- |
| 118,054 | Australia | Feb. 3, 1944 |